US009167379B1

(12) United States Patent
Hamilton et al.

(10) Patent No.: US 9,167,379 B1
(45) Date of Patent: Oct. 20, 2015

(54) AUTOMATIC LOCATION-BASED EMERGENCY RESPONSE SYSTEM

(71) Applicants: Mark David Hamilton, San Diego, CA (US); Rochelle Rae Newsome, San Marcos, CA (US); Scott Michael MacDonald, Norfolk, MA (US); Paul L. Crosby, San Diego, CA (US); Chen-Lu Meng, San Diego, CA (US); Eyal Levin, San Diego, CA (US)

(72) Inventors: Mark David Hamilton, San Diego, CA (US); Rochelle Rae Newsome, San Marcos, CA (US); Scott Michael MacDonald, Norfolk, MA (US); Paul L. Crosby, San Diego, CA (US); Chen-Lu Meng, San Diego, CA (US); Eyal Levin, San Diego, CA (US)

(73) Assignee: TriTech Software Systems, San Diego, CA (US)

( * ) Notice: Subject to any disclaimer, the term of this patent is extended or adjusted under 35 U.S.C. 154(b) by 221 days.

(21) Appl. No.: 13/717,525

(22) Filed: Dec. 17, 2012

(51) Int. Cl.
  *H04M 11/04* (2006.01)
  *H04W 4/02* (2009.01)

(52) U.S. Cl.
  CPC ...................................... *H04W 4/02* (2013.01)

(58) Field of Classification Search
  CPC . H04L 12/1895; H04L 12/5895; H04L 51/38; H04M 11/04; H04W 4/14; H04W 4/22; H04W 76/007
  See application file for complete search history.

(56) References Cited

U.S. PATENT DOCUMENTS

| 6,370,234 | B1 | 4/2002 | Kroll ................................ 379/45 |
| 6,466,258 | B1 | 10/2002 | Mogenis et al. .............. 348/143 |
| 6,563,910 | B2 | 5/2003 | Menard et al. .................. 379/45 |
| 7,031,714 | B1 | 4/2006 | Rayburn ....................... 455/445 |
| 7,302,250 | B2 | 11/2007 | Chin et al. .................. 455/404.1 |
| 7,515,693 | B2 | 4/2009 | Salafia et al. ................... 379/45 |
| 7,646,854 | B2 | 1/2010 | Anderson ....................... 379/45 |
| 7,646,858 | B2 | 1/2010 | Salafia et al. ............ 379/201.01 |
| 7,991,124 | B2 | 8/2011 | Anderson ....................... 379/45 |
| 8,050,386 | B2 | 11/2011 | Dickinson ....................... 379/45 |
| 2005/0215229 | A1 | 9/2005 | Cheng ......................... 455/404.1 |
| 2007/0121799 | A1 | 5/2007 | Binning .......................... 379/37 |
| 2008/0243545 | A1* | 10/2008 | D'Ambrosia et al. ............ 705/2 |
| 2008/0267360 | A1* | 10/2008 | Spector ........................... 379/45 |
| 2008/0299940 | A1* | 12/2008 | Shaffer et al. .............. 455/404.2 |
| 2010/0291894 | A1 | 11/2010 | Pipes ......................... 455/404.2 |
| 2011/0151829 | A1 | 6/2011 | Velusamy et al. .......... 455/404.2 |
| 2012/0045039 | A1 | 2/2012 | Dickinson ....................... 379/45 |
| 2012/0218102 | A1* | 8/2012 | Bivens et al. ............. 340/539.13 |

* cited by examiner

*Primary Examiner* — Quan M Hua
(74) *Attorney, Agent, or Firm* — Pillsbury Winthrop Shaw Pittman LLP

(57) ABSTRACT

Systems and methods to automatically provide emergency information to emergency responders operate responsive to an incoming emergency call being placed to an emergency call center. Based on geographical information associated with an emergency call, a determined set of emergency responders is alerted and/or notified as soon as possible, e.g. before the call is answered and/or before the call is completed.

20 Claims, 3 Drawing Sheets

AUTOMATIC LOCATION-BASED EMERGENCY RESPONSE SYSTEM

FIELD OF THE DISCLOSURE

This disclosure relates to providing information regarding emergency calls to emergency responders.

BACKGROUND

Conventionally, emergency phone calls are answered by an emergency call center, such as, e.g., a public safety answering point (PSAP). Operators at emergency call centers, also referred to as dispatchers or emergency dispatchers, may gather information during emergency calls, including, but not limited to, the name of the caller, the nature of the emergency, the location of the emergency, and/or other emergency information. Operators may determine the appropriate type of first response, including but not limited to police, fire, medical, and/or other types of first response. Operators may contact a dispatcher for the determined type, e.g. a police dispatcher, fire dispatcher, medical dispatcher, and/or other type of dispatcher. In turn, the police dispatcher may contact appropriate emergency responders, such as one or more police officers that are on duty and, e.g., near the location of the emergency.

SUMMARY

One aspect of the disclosure relates to a system configured to automatically provide emergency information to emergency responders, preferably with very little delay. As used herein, the term "automatically" refers to the system's one or more operations or one or more accomplishments that occur and/or proceed without manual and/or human intervention. The system may be controlled and/or guided programmatically by its design and by virtue of the functionality of its components, as described herein. By providing information to emergency responders automatically, the opportunity for human operators to introduce errors and/or delays may be reduced, minimized, and/or removed. The system is configured to respond rapidly to incoming emergency calls being placed to an emergency call center not only before such calls are answered, but also, at least in significant part, irrespective of whether such a call is answered, handled, completed, and/or otherwise processed by the emergency call center.

The system may be hosted by and/or implemented on a server. Callers, operators, dispatchers, and/or emergency responders may interact and/or communicate with and/or through the system. Interaction and/or communication may be implemented by telephones, electronic devices, communication devices, client computing platforms and/or servers. Interaction and/or communication with the system may be implemented over one or more networks, including, but not limited to, wired telephone networks, wireless telephone networks, the internet, and/or other networks.

The system may include one or more of one or more servers, one or more emergency call centers, and/or other components. The server(s) may be configured to communicate according to a client/server architecture. Callers, operators, dispatchers, and emergency responders may be referred to as users of the system. Users may access the system via landlines, wired telephones, wireless telephones, smartphones, electronic devices, communication devices, client computing platform(s), and/or other devices or combinations thereof, jointly referred to herein as client devices. Callers may generate emergency calls via landlines, wired telephones, wireless telephones, smartphones, electronic devices, communication devices, client computing platform(s), and/or other devices or combinations thereof, jointly referred to herein as emergency calling devices.

The server(s) may include electronic storage, one or more processors, and/or other components. The server(s) may be configured to execute one or more computer program modules. The computer program modules may include one or more of a call monitor module, a location module, a responder module, a notification module, an alert module, and/or other modules.

The call monitor module may be configured to monitor incoming emergency calls being placed to an emergency call center. Emergency calls are produced, generated and/or originated by callers using emergency calling devices. The call monitor module may be configured to monitor an emergency call before the emergency call center answers the emergency call. The call monitor module may be implemented, embedded, combined, and/or integrated with one or more emergency call centers to accomplish the functions attributed in this disclosure to the call monitor module.

Emergency calls may be associated with different types of emergency information, including, but not limited to, subscriber information, household information, location-based information, one or more types of emergency, historical emergency information, and/or other information. Such information may have been gathered and/or processed in advance of an emergency call, for example through one or more databases that link telephone numbers to residence addresses. For example, subscriber information may include identification of the caller, such as, by way of non-limiting example, a telephone number, an IP address, information from one or more radio towers used in establishing the call, a billing address, a residence address, and/or other information.

Emergency calls may be text-based and/or turn-based, such as a text message, voicemail, video message, email (conversations), and/or other text-based and/or turn-based communication. For the purposes of this disclosure, a conversation using text-based or turn-based communication may be regarded as a single emergency call. Historical emergency information may include one or more of previous emergency calls from the same emergency calling device, the same caller, the same or similar location, related emergency calling devices and/or client devices, related callers, and/or other information. For example, a single caller may have multiple telephones with different phone numbers. For example, a group of callers may live at the same address. These examples are not intended to be limiting in any way. Other types of relations between emergency calling devices, callers, locations, etc. are contemplated within the scope of this disclosure.

The location module may be configured to determine locations associated with incoming emergency calls. The locations may include geographical locations such as (physical) addresses, city blocks, a particular area, and/or other locations. Information related to location may be received from an emergency calling device generating an emergency call. Determinations by the location module may be based on any emergency information associated with the emergency call. Determinations by the location module may be responsive to an emergency call being placed to the emergency call center. Determinations by the location module may be made prior to such an emergency call being answered at emergency call center.

The emergency responders and/or emergency dispatchers may be associated with location-based information and/or location information, including, by way of non-limiting example, current or last known geographical locations, current of last known (physical) addresses, one or more city blocks, a particular area of a city, town, county, and/or other governmental entity, and/or other location information, as well as combinations thereof. For example, an emergency responder may be associated with one or more city blocks because a previous communication came from that location, previously obtained GPS-information and/or other location information indicates that particular area, a schedule indicates that particular area falls within the current area under current (patrol) duty of the particular emergency responder, and/or for other reasons and/or combinations of factors. The size of the geographical area that is associated with different emergency responders may be different. For example, emergency responders stationed at a particular fire station may cover and/or carry responsibility for a greater area than a policeman patrolling several city blocks in a downtown area on foot. The location and/or size of the geographical area associated with a particular emergency responder may change over time. For example, a highway patrolman may gradually move north along a particular road as his shift advances. In some implementations, a particular emergency responder may be associated with multiple geographical locations. For example, a first location may correspond to his current location, a second location may correspond to a larger area currently assigned to his responsibility, and a third location or area may correspond, e.g. dynamically, to a section of a city or county that meets certain criteria. For example, a criterion may be that the particular emergency responder is estimated to be able to reach any location within the third area within a predetermined time limit, such as 5 minutes, 10 minutes, 15 minutes, and/or another time limit.

The responder module may be configured to select and/or determine sets of one or more emergency responders and/or emergency dispatchers. The emergency responders and/or emergency dispatchers may be selected and/or determined based on emergency information associated with the emergency calls. For example, the responder module may be configured to determine a set of emergency responders for an incoming emergency call. Determinations by the responder module may be based on the geographical locations that have been determined by the location module. The geographical locations may be associated with the incoming emergency calls. The determination of the set may be based on a comparison and/or match of a particular geographical location associated with a particular incoming emergency call and the location information of emergency responders.

The comparison may be based on geographical distance between the location associated with a call and the one or more geographical locations of one or more emergency responders. For example, the nearest N emergency responders may be selected in a particular set for an incoming call, where N may be a predetermined target number, such as 2, 3, 5, 8, at least 2, at most 10, and/or any other suitable predetermined target number. In some implementations, the comparison may be based on the estimated time it would take an emergency responder to reach the location associated with a particular call. For example, the closest N emergency responders, in terms of time, may be selected in a particular set for an incoming call. Alternatively, and/or simultaneously, the comparison may be based on one or more other criteria, and/or combinations of various criteria. Determinations by the responder module may be responsive to an emergency call being placed to the emergency call center.

The notification module may be configured to generate and/or produce notifications for emergency responders and/or emergency dispatchers. Notifications may correspond to incoming emergency calls. Individual notifications may correspond to individual emergency calls. Determinations by the notification module may be responsive to an emergency call being placed to the emergency call center.

The notification module may be configured to enter emergency information in one or more forms or fields that, by way of non-limiting example, may be included in an electronic document. In some implementations, multiple notifications may correspond to the same emergency call. For example, as more emergency information is obtained and/or becomes available regarding a particular emergency, existing notifications may be modified and/or additional notifications may be generated and/or produced.

The alert module may be configured to provide notifications automatically to one or more emergency responders and/or emergency dispatchers. By providing notifications automatically to one or more emergency responders, the opportunity for human operators to introduce errors and/or delays may be reduced, minimized, and/or removed. The notifications may be generated and/or produced by the notification module. The alert module may be configured to provide notifications to a determined and/or selected set of emergency responders and/or emergency dispatchers. The alert module may be configured to provide notifications to a set that is determined and/or selected by the responder module. The alert module may be configured to operate automatically. The alert module may operate without human intervention. Operation of the alert module may be responsive to emergency calls being placed to the emergency call center. Operation of the alert module may be independent of operations of the emergency call center. For example, the alert module may operate pertaining to a particular emergency call without regard for whether the emergency call center has answered the particular emergency call and/or completed handling of the particular emergency call. By virtue of providing notifications as described herein, emergency responders may act faster, arrive at the location of an emergency sooner, experience fewer errors in the provided emergency information, have additional information that may otherwise not have been available or not available as soon as by using this system, and/or experience other preferred effects that are enabled by the functionality described herein.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
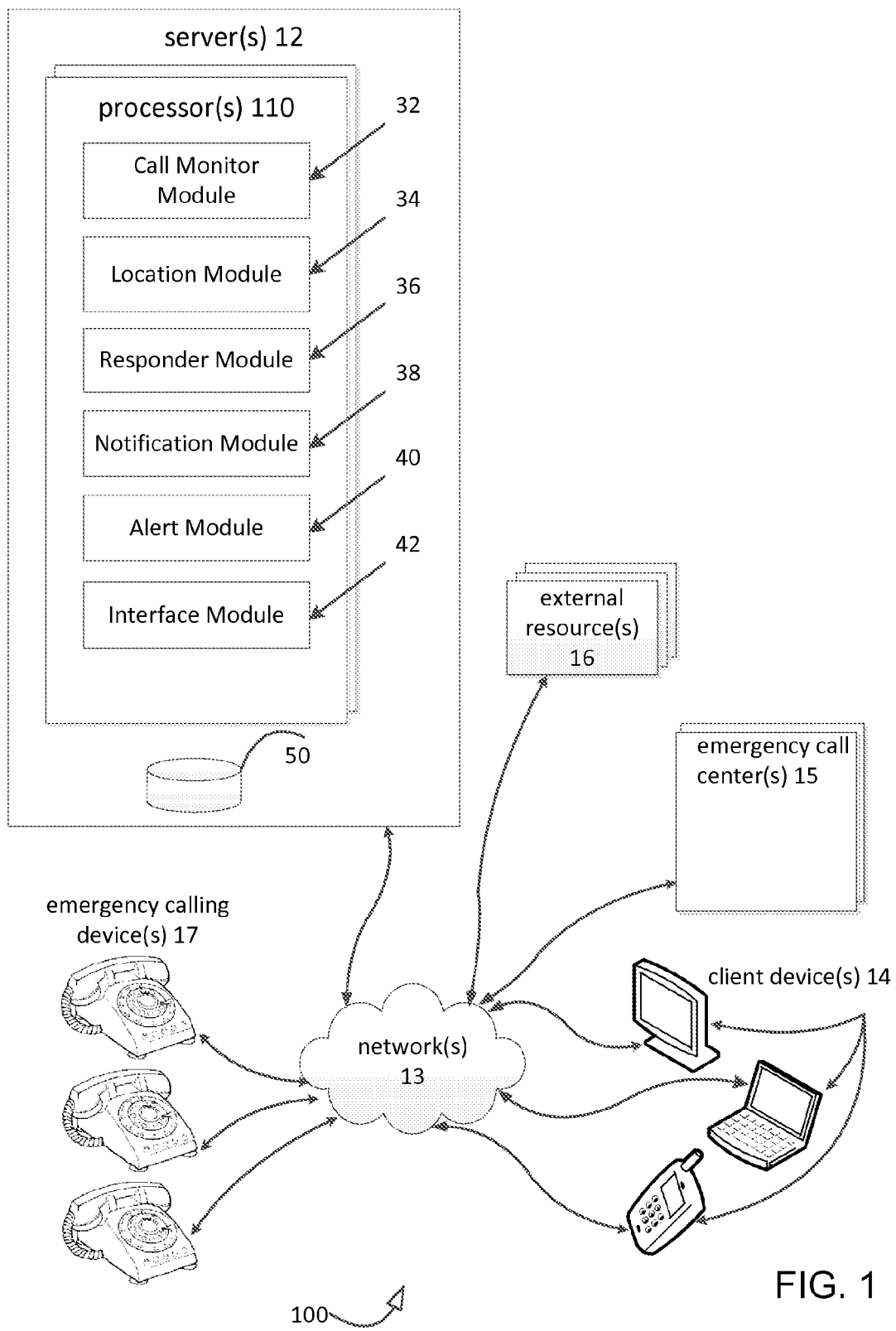
FIG. 1 illustrates a system configured to automatically provide emergency information to emergency responders, in accordance with one or more implementations.

FIG. 1 illustrates a system 100 configured to automatically provide emergency information to emergency responders, in accordance with one or more implementations. System 100 may include one or more servers 12, one or more emergency call centers 15, one or more client devices 14, one or more emergency calling devices 17, and/or other components.

Server(s) 12 may be configured to communicate with one or more client devices 14 and/or one or more emergency calling devices 17 according to a client/server architecture. Components of system 100 may communicate over one or more networks 13. Communication may use techniques including, but not limited to, wired, wireless, and/or combinations thereof. In some implementations, system 100 may include communication using a peer-to-peer architecture. Users may access system 100 via client device(s) 14, emergency calling device(s) 17, and/or other devices.

Server(s) 12 may include electronic storage 50, one or more processors 110, and/or other components. Server(s) 12 may include communication lines, or ports to enable the exchange of information with one or more networks 13 and/or other computing platforms. Illustration of server(s) 12 in FIG. 1 is not intended to be limiting. Server(s) 12 may include a plurality of hardware, software, and/or firmware components operating together to provide the functionality attributed herein to server(s) 12. For example, server(s) 12 may be implemented by a cloud of computing platforms operating together as server(s) 12.

In some implementations, server(s) 12, client device(s) 14, emergency calling device(s) 17, and/or external resources 16 may be operatively linked via one or more electronic communication links. For example, such electronic communication links may be established, at least in part, via one or more networks 13, including, e.g., the internet and/or other networks. It will be appreciated that this is not intended to be limiting, and that the scope of this disclosure includes implementations in which server(s) 12, client device(s) 14, emergency calling device(s) 17, and/or external resources 16 may be operatively linked via some other communication media.

External resources 16 may include sources of information, hosts and/or providers of communication systems outside of system 100, external entities participating with system 100, and/or other resources. In some implementations, some or all of the functionality attributed herein to external resources 16 may be provided by resources included in system 100.

Server(s) 12 may be configured to execute one or more computer program modules. The computer program modules may include one or more of a call monitor module 32, a location module 34, a responder module 36, a notification module 38, an alert module 40, an interface module 42, and/or other modules.

Call monitor module 32 may be configured to monitor incoming emergency calls being placed to an emergency call center 15. Emergency calls may be associated with different types of emergency information. Emergency calls may be produced, generated and/or originated by callers using emergency calling devices 17. Call monitor module 32 may be configured to monitor an emergency call before emergency call center 15 answers the emergency call. Call monitor module 32 may be implemented, embedded, combined, and/or integrated with one or more emergency call centers 15 to accomplish the functions attributed in this disclosure to call monitor module 32.

In some implementations, call monitor module 32 may be configured to monitor incoming emergency calls directly and/or before the calls enter and/or engage with an emergency call center 15. In some implementations, call monitor module 32 may be configured to obtain access to incoming emergency calls and/or monitor incoming emergency calls before, during, and/or after an emergency call center 15 engages with an incoming emergency call.

Location module 34 may be configured to determine locations associated with incoming emergency calls. The locations may include geographical locations such as (physical) addresses, city blocks, a particular area, and/or other locations. Information may have been gathered and/or processed in advance of a particular emergency call, for example through one or more databases that link telephone numbers to residence addresses. Information related to location may be received from emergency calling device 17 generating an emergency call. Such information may include geolocation information determined on the emergency calling device (e.g., global positioning system information, cell tower triangulation information, and/or other information). Information related to location may be obtained from external resources 16. For example, location module 34 may be configured to query an external database using the telephone number associated with the emergency calling device generating the emergency call. The external database may store associations between telephone numbers and residential addresses. Determinations by location module 34 may be based on any emergency information associated with the emergency call. Determinations by location module 34 may be responsive to an emergency call being placed to emergency call center 15. Determinations by location module 34 may be made prior to such an emergency call being answered at emergency call center 15.

The emergency responders and/or emergency dispatchers may be associated with location-based information and/or location information, including, by way of non-limiting example, current or last known geographical locations, current of last known (physical) addresses, one or more city blocks, a particular area of a city, town, county, and/or other governmental entity, and/or other location information, as well as combinations thereof. For example, an emergency responder may be associated with one or more city blocks because a previous communication came from that location, previously obtained GPS-information and/or other location information indicates that particular area, a schedule indicates that particular area falls within the current area under current (patrol) duty of the particular emergency responder, and/or for other reasons and/or combinations of factors. The size of the geographical area that is associated with different emergency responders may be different. For example, emergency responders stationed at a particular fire station may cover and/or carry responsibility for a greater area than a policeman patrolling several city blocks in a downtown area on foot. The location and/or size of the geographical area associated with a particular emergency responder may change over time. For example, a highway patrolman may gradually move north along a particular road as his shift advances. In some implementations, a particular emergency responder may be associated with multiple geographical locations. For example, a first location may correspond to his current location, a second location may correspond to a larger area currently assigned to his responsibility, and a third location or area may correspond, e.g. dynamically, to a section of a city or county that meets certain criteria. For example, a criterion may be that the particular emergency responder is estimated to be able to reach any location within the third area within a predetermined time limit, such as 5 minutes, 10 minutes, 15 minutes, and/or another time limit.

Responder module 36 may be configured to select and/or determine sets of one or more emergency responders and/or emergency dispatchers. The emergency responders and/or emergency dispatchers may be selected and/or determined based on emergency information associated with the emergency calls. For example, responder module 36 may be configured to determine a set of emergency responders for an incoming emergency call. Determinations by responder module 36 may be based on the geographical locations that have been determined by location module 34. The geographical locations may be associated with the incoming emergency calls. The determination of the set may be based on a comparison and/or match of a particular geographical location associated with a particular incoming emergency call and the location information of emergency responders.

The comparison by responder module 36 may be based on geographical distance between the location associated with a call and the one or more geographical locations of one or more emergency responders. For example, the nearest N emergency responders may be selected in a particular set for an incoming call, where N may be a predetermined target number, such as 2, 3, 5, 8, at least 2, at most 10, and/or any other suitable predetermined target number. In some implementations, the comparison may be based on the estimated time it would take an emergency responder to reach the location associated with a particular call. For example, the closest N emergency responders, in terms of the estimated time, may be selected in a particular set for an incoming call.

In some implementations, the comparison may be based on an absolute distance between the location associated with a call and the one or more geographical locations of one or more emergency responders. For example, the absolute distance may be a predetermined distance such as, by way of non-limiting example, about 1 mile, about 2 miles, about 3 miles, about 5 miles, about 10 miles, and/or other suitable distances. In some implementations, if the selected and/or determined set of emergency responders fails to breach a predetermined minimum threshold of a preferred number of selected and/or determined emergency responders, responder module 36 may be configured to increase the predetermined distance used for comparisons of absolute distance. Conversely, if the selected and/or determined set of emergency responders breaches a predetermined maximum threshold of a preferred number of emergency responders, responder module 36 may be configured to reduce the predetermined distance used for comparisons of absolute distance. The minimum threshold and/or maximum threshold may be determined dynamically, e.g. based on emergency information. For example, certain types of emergencies, such as a building being on fire, may have higher thresholds than other types of emergencies, such as a kitten being stuck in a tree. Other types of emergency information may be used as a basis to alter how responder module 36 operates. Alternatively, and/or simultaneously, the comparison may be based on one or more other criteria, and/or combinations of various criteria. Determinations by responder module 36 may be responsive to an emergency call being placed to emergency call center 15.

Notification module 38 may be configured to generate and/or produce notifications for emergency responders and/or emergency dispatchers. Notifications may correspond to incoming emergency calls. Individual notifications may correspond to individual emergency calls. Determinations by notification module 38 may be responsive to an emergency call being placed to emergency call center 15.

Notification module 38 may be configured to enter emergency information in one or more forms or fields that, by way of non-limiting example, may be included in one or more electronic documents. In some implementations, multiple notifications may correspond to the same emergency call. For example, as more emergency information is obtained and/or becomes available regarding a particular emergency, existing notifications may be modified and/or additional notifications may be generated and/or produced. In some implementations, electronic documents may be implemented as webpages that may be securely access by emergency responders. For example, a notification may include a link to a particular electronic document or web page that includes emergency information.

In some implementations, notification module 38 may be configured to add information to a previous notification and/or update or correct a previous notification. For example, as an emergency call progresses through various stages and/or statuses, a notification may reflect such progress. For example, the notification may indicate whether and/or when a particular emergency call has been answered, whether a specific geographical address has been identified by a caller, a type and/or status of an emergency (such as, by way of non-limiting example, robbery in progress, burglary in a residence, or tree fallen on a road), a level of urgency associated with an emergency, a level of threat associated with an emergency, and/or other progress or status information that may be relevant to emergency responders. In some implementations, progress and/or status information may be color-codes such that emergency responders can rapidly learn about information that may be relevant. In some implementations, progress information may indicate whether a call ended abruptly, e.g. by the caller hanging up.

In some implementations, notification module 38 may be configured to determine and/or obtain personal information associated with an emergency call. Personal information may include one or more names, ages, gender, and/or other personal information associated with a caller, a registered user for a particular telephone number, a registered resident at a particular (billing) address, and/or other people. In some implementations, personal information may include historical emergency information, such as the names of one or more people that were in some way associated with a previous emergency call, which in turn is in some way related to a current emergency call. For example, if a particular caller has called on one or more previous occasions regarding a particular disturbance (by way of non-limiting example, a previous occasion may be related to domestic abuse) that involved one or more particular people, information to that effect may be relevant to emergency responders. Personal information may be included and/or linked to notifications provided by notification module 38.

Alert module 40 may be configured to provide notifications automatically to one or more emergency responders and/or emergency dispatchers. By providing notifications automatically to one or more emergency responders, the opportunity for human operators to introduce errors and/or delays may be reduced, minimized, and/or removed. The notifications may be generated and/or produced by the notification module. Alert module 40 may be configured to provide notifications to a determined and/or selected set of emergency responders and/or emergency dispatchers. Alert module 40 may be configured to provide notifications to a set that is determined and/or selected by responder module 36.

Alert module 40 may be configured to operate automatically. Alert module 40 may operate without human intervention. Operation of alert module 40 may be responsive to emergency calls being placed to emergency call center 15. Operation of alert module 40 may be independent of operations of emergency call center 15. For example, alert module 40 may operate pertaining to a particular emergency call without regard for whether emergency call center 15 has answered the particular emergency call and/or completed handling of the particular emergency call. By virtue of providing notifications as described herein, emergency responders may act faster, arrive at the location of an emergency sooner, experience fewer errors in the provided emergency information, have additional information that may otherwise not have been available or not available as soon as by using this system, and/or experience other preferred effects that are enabled by the functionality described herein.

Users may participate in system 100 through client devices 14, emergency calling devices 17, and/or other devices. For example, interaction may be controlled through control inputs and/or commands input by the users through client devices 14 and/or emergency calling device(s) 17. By way of non-limiting example, input from users may be entered using interface devices including, but not limited to, a telephone, a keypad, buttons, switches, a keyboard, knobs, levers, a display screen, a touch screen, speakers, a microphone, an indicator light, an audible alarm, a printer, and/or any combinations thereof. By way of non-limiting example, client devices 14 and/or emergency calling devices 17 may include one or more of a desktop computer, a laptop computer, a handheld computer, a NetBook, a tablet, a Smartphone, a gaming console, and/or other computing platforms. Note that the depictions of devices and/or icons used in FIG. 1 are not intended to be limiting in any way. For example, a cellphone could be an emergency calling device 17.

Interface module 42 may be configured to present, display, render, generate, and/or implement (hereinafter referred to as "present" or a "presentation of") user interfaces for users to interact with system 100. In some implementations, user interfaces may be configured to present notifications provided by notification module 38, alert module 40, and/or other components of system 100.

Interface module 42 may be configured to present interfaces through client devices 14. User interfaces may be provided to users via client devices 14. Interface module 42 may be configured to receive one or more inputs (e.g. control inputs and/or command inputs) from an individual user that affect presentation of an individual user interface. The user interface may present an offered set of user-selectable options for the presentation of notifications, alerts, emergency information, and/or other information. The received inputs may include one or more selections from the offered set of user-selectable options. Alternatively, and/or simultaneously, a user interface may provide other ways for users to affect the presentation, including, but not limited to, textual input, touch screen gestures, pointer device input, and/or other ways for users to affect the presentation.

Figure 3:
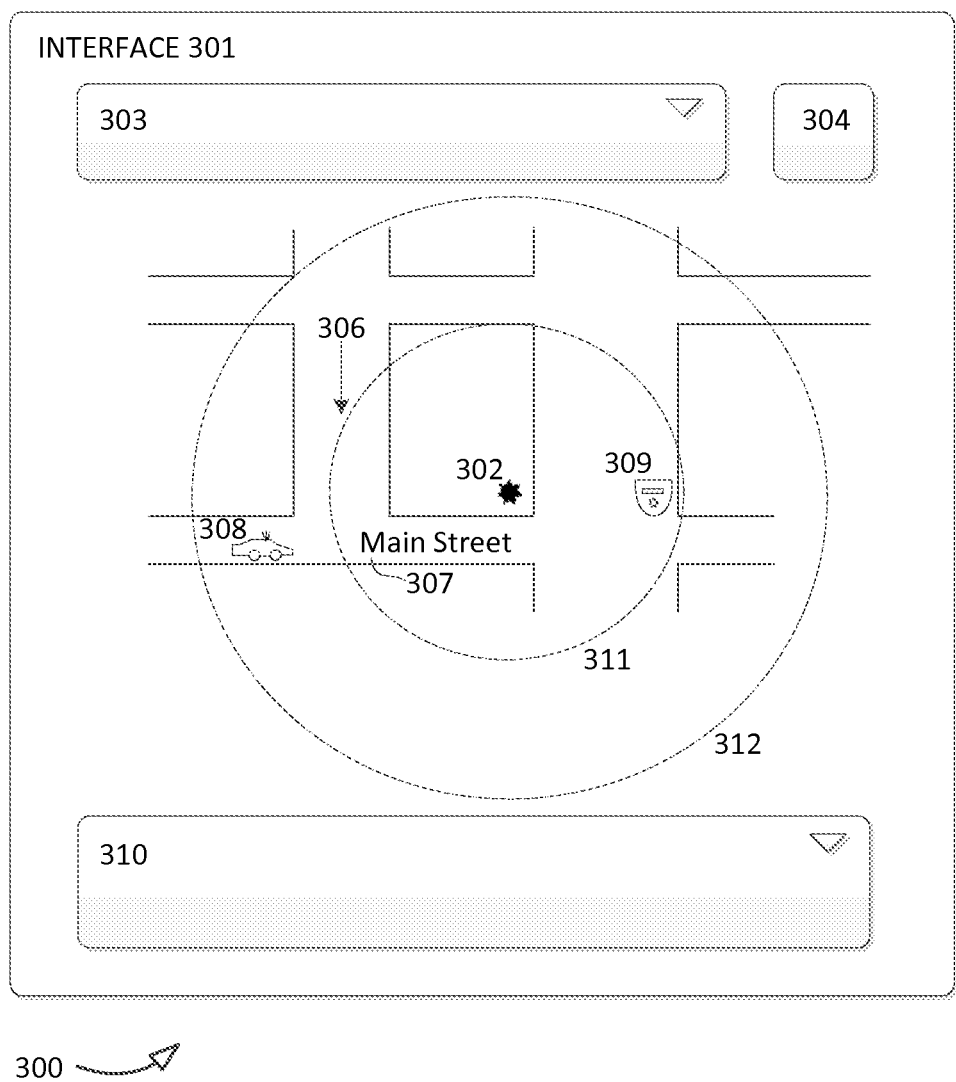
FIG. 3 illustrates a view of an exemplary interface in accordance with one or more implementations.

By way of illustration, FIG. 3 illustrates a view 300 of a user interface 301 as presented to a particular user. User interface 301 may be presented through a client device. User interface 301 may be presented in response to an emergency call being placed to and/or being handled by an emergency call center. This emergency call may be referred to as the current emergency call in reference to FIG. 3. Elements of user interface 301 may be implemented as fields configured to receive entry, selection, and/or confirmation from a user. The fields may include one or more of a text entry field, a set of selectable menu items, a selectable field, and/or other fields configured to receive entry, selection, and/or confirmation from a user. The number of elements, components, and/or (user-selectable) fields depicted in FIG. 3 is meant to be exemplary, and not limiting in any way. User interface 301 may be configured to present information to and/or enable interaction with the user viewing view 300.

User interface 301 of FIG. 3 may include a first icon 302, a second icon 308, a third icon 309, location information 307 and 306, emergency-specific interface elements 303 and 304, emergency responder-specific interface element 310, a first perimeter 311, a second perimeter 312, and/or other components or features. An area of user interface 301, e.g. the center as shown in FIG. 3, may schematically depict a map of a particular geographical area, in particular an area relevant to the current emergency call. For example, the map may include streets and location information 307 and 306. For example, location information 307 may be a street name. For example, location information 306 may indicate street attributes, such as a one-way street. Location information 306 may be updated dynamically, for example to reflect traffic conditions, road blocks, etc. First icon 302 may indicate and/or represent a location of the current emergency call and/or the caller who generated the current emergency call. First icon 302 may have a particular color, shape, and/or graphically distinguishable characteristic such that a user may rapidly obtain relevant information about the current emergency call. Emergency-specific interface elements 303 and 304 may, e.g., be an object, interface, and/or other items that a user viewing view 300 may interact with, such as a menu of user-selectable options and/or actions for engaging the system. For example, emergency-specific interface element 303 may display a name and/or address (or any other emergency information) associated with the current emergency call. For example, emergency-specific interface element 304 may indicate an emergency type, current stage, current status, and/or current status information of an emergency and/or emergency call.

Second icon 308 may indicate and/or represent a location of an emergency responder. Second icon 308 may have a particular color, shape (e.g. of a car), and/or graphically distinguishable characteristic such that a user may rapidly obtain relevant information about the emergency responder. As depicted in FIG. 3, second icon 308 may represent a patrol car and/or a policeman driving a patrol car. Third icon 309 may indicate and/or represent a location of an emergency responder. Third icon 309 may have a particular color, shape (e.g. of a badge), and/or graphically distinguishable characteristic such that a user may rapidly obtain relevant information about the emergency responder. As depicted in FIG. 3, third icon 309 may represent a policeman on foot. First perimeter 311 may indicate the geographical area within a predetermined distance (in estimated time to reach the current emergency or space) of the location indicated by first icon 302. As depicted in FIG. 3, the emergency responder represented by third icon 309 may be currently within first perimeter 311, whereas the emergency responder represented by second icon 308 may not be. Second perimeter 312 may indicate a geographical area within a different and greater distance (in estimated time to reach the current emergency or space) of the location indicated by first icon 302 than first perimeter 311. By way of non-limiting example, first perimeter 311 may indicate 1 mile, 2 miles, 5 miles, 1 minute, 2 minutes, 5 minutes, and/or another suitable distance. By way of non-limiting example, second perimeter 311 may indicate 3 miles, 6 miles, 10 miles, 3 minutes, 6 minutes, 10 minutes, and/or another suitable distance.

Emergency-responder-specific interface element 310 may, e.g., be an object, interface, and/or other items that a user viewing view 300 may interact with, such as a menu of user-selectable options and/or actions for engaging the system. For example, interface element 310 may depict information about and/or from one or more emergency responders. For example, interface element 310 may show a set of emergency responders that have been notified about the current emergency call, that are currently located within first perimeter 311 and/or second perimeter 312, and/or other information. In some implementations, an emergency responder may be able to communicate with the user viewing view 300. For example, an emergency responder may provide updated information about the current emergency, about his location and/or status, and/or other information.

Referring to FIG. 1, server(s) 12, client device(s) 14, and/or emergency calling devices 17 may include electronic storage 50. Electronic storage 50 may comprise electronic storage media that electronically stores information. The functionality of electronic storage 50 may be similar between different instantiations, even if the stored information may be different. The electronic storage media of electronic storage 50 may include one or both of system storage that is provided integrally (i.e., substantially non-removable) and/or removable storage that is removably connectable to server(s) 12 and/or client device(s) 14 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 50 may include one or more virtual storage resources (e.g., cloud storage, a virtual private network, and/or other virtual storage resources). Electronic storage 50 may store software algorithms, information determined by processor(s) 110, information received from components of system 100, and/or other information that enables server(s) 12 and/or client device(s) 14 to function as described herein.

Server(s) 12 and client device(s) 14 may include processor(s) 110. Processor(s) 110 may be configured to provide information processing capabilities in server(s) 12 and/or client device(s) 14. The functionality of processor(s) 110 may be similar between different instantiations, even if the processing capabilities may be different. Processor(s) 110 may include one or more of a digital processor, an analog processor, a digital circuit designed to process information, an analog circuit designed to process information, and/or other mechanisms for electronically processing information. Although processor(s) 110 is shown in FIG. 1 as a single entity, this is for illustrative purposes only. In some implementations, processor(s) 110 may include a plurality of processing units. These processing units may be physically located within the same device, or processor(s) 110 may represent processing functionality of a plurality of devices operating in coordination. The processor(s) 110 may be configured to execute modules 32-42, and/or other modules. Processor 110 may be configured to execute modules 32-42, and/or other modules by software; hardware; firmware; some combination of software, hardware, and/or firmware; and/or other mechanisms for configuring processing capabilities on processor(s) 110.

It should be appreciated that although modules 32-42 are illustrated in FIG. 1 as being co-located within a single processing unit, in implementations in which processor(s) 110 includes multiple processing units, one or more of modules 32-42 may be located remotely from the other modules. The description of the functionality provided by the different modules 32-42 described below is for illustrative purposes, and is not intended to be limiting, as any of modules 32-42 may provide more or less functionality than is described. For example, one or more of modules 32-42 may be eliminated, and some or all of its functionality may be provided by other ones of modules 32-42. As another example, processor 110 may be configured to execute one or more additional modules that may perform some or all of the functionality attributed herein to one of modules 32-42.

It is noted that the division of functionality between server(s) 12 and client device(s) 14 is not intended to be limited by this disclosure. Functions described in relation with server(s) 12 may be performed and/or shared by one or more other components of system 100, including client device(s) 14, and/or vice versa.

Figure 2:
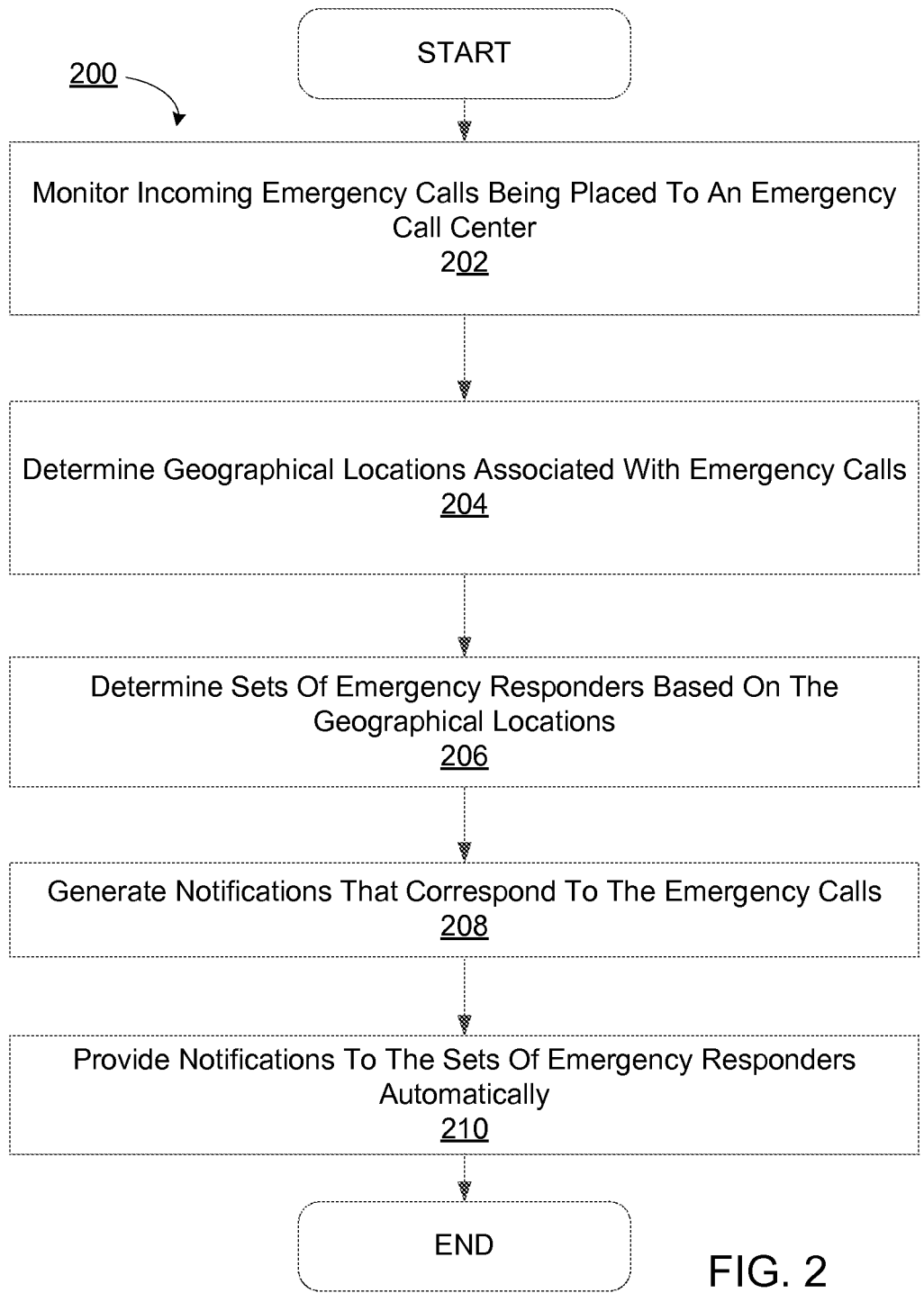
FIG. 2 illustrates a method for automatically providing emergency information to emergency responders, in accordance with one or more implementations.

FIG. 2 illustrates a method 200 for automatically providing emergency information to emergency responders, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, incoming emergency calls being placed to an emergency call center are monitored. The emergency calls may include a first call. In some implementations, operation 202 is performed by a call monitor module the same as or similar to call monitor module 32 (shown in FIG. 1 and described herein).

At an operation 204, geographical locations associated with the incoming emergency calls are determined. The geographical locations may include a first geographical location associated with the first call. In some implementations, operation 204 is performed by a location module the same as or similar to location module 34 (shown in FIG. 1 and described herein).

At an operation 206, sets of emergency responders are determined for the incoming emergency calls based on the geographical locations. Responsive to the first call being placed to the emergency call center, the sets may include a first set of emergency responders for the first call based on the first geographical location. In some implementations, operation 206 is performed by a responder module the same as or similar to responder module 36 (shown in FIG. 1 and described herein).

At an operation 208, notifications are generated that correspond to the incoming emergency calls. Responsive to the first call being placed to the emergency call center, the notifications may include a first notification that corresponds to the first call. In some implementations, operation 208 is performed by a notification module the same as or similar to notification module 38 (shown in FIG. 1 and described herein).

At an operation 210, notifications are provided to sets of emergency responders automatically. Provision of the notifications may be responsive to the first call being placed to the emergency call center. The provided notifications may include the first notification to the first set of emergency responders. In some implementations, operation 210 is performed by an alert module the same as or similar to alert module 40 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to automatically provide emergency information to emergency responders, the system comprising:
   one or more processors configured to execute computer program modules, the computer program modules comprising:
   a call monitor module configured to monitor incoming emergency calls being placed to an emergency call center;
   a location module configured to determine geographical locations associated with the incoming emergency calls such that, responsive to a first call being placed by a first caller to the emergency call center regarding a first emergency, the location module determines a first geographical location associated with the incoming emergency call;
   a responder module configured to determine sets of emergency responders for incoming emergency calls based on the geographical locations associated with the incoming emergency calls, wherein the responder module is further configured to determine a threshold number of emergency responders, wherein the responder module is further configured such that, responsive to the first call being placed to the emergency call center, a first set of emergency responders including a first number of emergency responders for the first call is determined by the responder module based on proximity to the first geographical location and further based on a comparison of the threshold number with the first number of emergency responders;
   a notification module configured to generate notifications that correspond to the incoming emergency calls such that, responsive to the first call being placed to the emergency call center, a first notification corresponding to the first call is generated by the notification module, wherein the first notification includes status information regarding the first emergency; and
   an alert module configured to provide notifications to the determined sets of emergency responders, wherein provision of the notifications is implemented automatically, responsive to the individual emergency calls being placed to the emergency call center such that, responsive to the first call being placed to the emergency call center, provision of the first notification to the first set of emergency responders is implemented automatically, and such that the status information regarding the first emergency is accessible to the first set of emergency responders,
   wherein the notification module is further configured to, responsive to additional emergency information regarding the first emergency becoming available, modify the status information included in the first notification, such that the modified status information regarding the first emergency is accessible to the first set of emergency responders.

2. The system of claim 1, wherein the call monitor module monitors incoming emergency calls before the emergency calls are answered by the emergency call center.

3. The system of claim 1, wherein determinations by the location module are based on one or more of global positioning system (GPS) information, information from one or more radio towers, and/or a database that links telephone numbers to addresses.

4. The system of claim 1, wherein the threshold number is a maximum threshold number, and wherein the first set of emergency responders is reduced in number responsive to the first number exceeding the threshold number.

5. The system of claim 1, wherein the threshold number is a minimum threshold number of emergency responders of at least two, wherein the first set of emergency responders is determined based on distances between individual emergency responders and the first geographical location being less than a threshold distance, and wherein the first set of emergency responders is increased by increasing the threshold distance in response to the first number of emergency responders failing to reach the minimum threshold number of emergency responders.

6. The system of claim 1, wherein the notification module is further configured to determine personal information associated with notifications such that the first notification is associated with personal information of the first caller pertaining to the first call, and wherein the first set of emergency responders is determined based on estimated amounts of time required for individual emergency responders to reach the first geographical location being less than a predetermined time limit.

7. The system of claim 1, wherein the notification module is further configured to obtain information regarding incoming emergency calls, wherein the information is accessible to one or more emergency responders such that a first obtained information regarding the first call is included in the first notification and accessible to the first set of emergency responders.

8. The system of claim 7, wherein the first obtained information by the notification module includes status information regarding incoming emergency calls.

9. The system of claim 7, wherein the first obtained information by the notification module is editable through the emergency call center.

10. The system of claim 7, wherein the first obtained information by the notification module forms electronic documents, and wherein the electronic documents are accessible via a network.

11. A computer-implemented method for automatically providing emergency information to emergency responders, the method being performed by one or more processors configured to execute computer program modules, the method comprising:

monitoring incoming emergency calls being placed to an emergency call center, wherein the emergency calls include a first call by a first caller;

determining geographical locations associated with the incoming emergency calls, wherein the geographical locations include a first geographical location associated with the first call regarding a first emergency;

determining a threshold number of emergency responders;

determining sets of emergency responders for the incoming emergency calls based on the geographical locations, wherein, responsive to the first call being placed to the emergency call center, the sets include a first set of emergency responders including a first number of emergency responders for the first call based on proximity to the first geographical location and further based on a comparison of the threshold number with the first number of emergency responders;

generating notifications that correspond to the incoming emergency calls, wherein, responsive to the first call being placed to the emergency call center, the notifications include a first notification that corresponds to the first call, wherein the first notification includes status information regarding the first emergency;

providing notifications to sets of emergency responders automatically, wherein, responsive to the first call being placed to the emergency call center, the provided notifications include the first notification to the first set of emergency responders, wherein the first notification is provided such that the status information regarding the first emergency is accessible to the first set of emergency responders; and modifying, responsive to additional emergency information regarding the first emergency becoming available, the status information included in the first notification, such that the modified status information regarding the first emergency is accessible to the first set of emergency responders.

12. The method of claim 11, wherein monitoring the incoming emergency calls is performed before the incoming emergency calls are answered by the emergency call center.

13. The method of claim 11, wherein determination of the first geographical location is based on one or more of global positioning system (GPS) information, information from one or more radio towers, and/or a database that links telephone numbers to addresses.

14. The method of claim 11, wherein the threshold number is a maximum threshold number, and wherein the first set of emergency responders is reduced in number responsive to the first number exceeding the threshold number.

15. The method of claim 11, wherein the threshold number is a minimum threshold number of emergency responders of at least two, wherein determining the first set of emergency responders is based on distances between individual emergency responders and the first geographical location being less than a threshold distance, the method further comprising:

increasing the first set of emergency responders by increasing the threshold distance in response to the first number of emergency responders failing to reach the minimum threshold number of emergency responders.

16. The method of claim 11, further comprising:

determining personal information associated with the first notification, wherein the personal information includes one or more of a name, a gender, and/or an age of the first caller, wherein determining the first set of emergency responders is based on estimated amounts of time required for individual emergency responders to reach the first geographical location being less than a predetermined time limit.

17. The method of claim 11, further comprising:

obtaining information regarding incoming emergency calls, wherein the obtained information is accessible to one or more emergency responders.

18. The method of claim 17, wherein the obtained information includes status information regarding progress of incoming emergency calls.

19. The method of claim 17, wherein the obtained information that is accessible to one or more emergency responders is editable through the emergency call center.

20. The method of claim 17, wherein the obtained information forms one or more electronic documents, and wherein the one or more electronic documents are accessible via one or more networks.

* * * * *